United States Patent [19]

Hassan

[11] Patent Number: 4,681,304
[45] Date of Patent: Jul. 21, 1987

[54] DEFLECTION JOUNCE BUMPER FOR STRUT SUSPENSION

[75] Inventor: Morris Hassan, Trenton, Mich.

[73] Assignee: Chrysler Motors Corporation, Highland Park, Mich.

[21] Appl. No.: 842,589

[22] Filed: Mar. 21, 1986

[51] Int. Cl.$^4$ ............................................. F16F 1/36
[52] U.S. Cl. ........................... 267/8 R; 267/22 A; 267/63 R; 267/140; 267/141.6; 267/153; 280/668
[58] Field of Search ............... 267/8 R, 8 B, 8 C, 8 D, 267/8 A, 35, 33, 22 A, 63 R, 63 A, 116, 140, 140.1, 141, 141.6, 141.7, 152, 153, 140.2; 248/621, 562, 634, 636, 573; 280/668, 671, 662, 692, 697, 716; 293/110, 136, 107; 188/321.11; 213/59, 41

[56] References Cited

U.S. PATENT DOCUMENTS

| | | | |
|---|---|---|---|
| 2,515,422 | 7/1950 | Pietz | 267/141.7 |
| 3,323,763 | 6/1967 | Butts | 267/153 X |
| 3,954,257 | 5/1976 | Keijzer et al. | 280/668 X |
| 4,175,770 | 11/1979 | Draisbach et al. | 280/668 |
| 4,235,426 | 11/1980 | Sullivan, Jr. et al. | 267/8 R |
| 4,248,454 | 2/1981 | Cotter et al. | 280/668 |
| 4,256,292 | 3/1981 | Sullivan, Jr. et al. | 267/8 R |

Primary Examiner—Douglas C. Butler
Attorney, Agent, or Firm—Edward P. Barthel

[57] ABSTRACT

An improved deflection jounce bumper for a vehicle suspension strut. The bumper is a generally cylindrical shaped elastomeric member having a solid upper hub portion encircling the strut piston rod. A lower impact portion of the bumper has outer and inner concentric wall portions defining an intermediate downwardly opening channel. The wall sections are interconnected by a plurality of integral column-like mirror image arcuate bridging segments defining therebetween an axial blind bore. Upon the bumper being impacted the wall sections together with the bridging segments stretch to absorb impact energy thereby providing initially high dampening load displacement resistance.

4 Claims, 4 Drawing Figures

U.S. Patent    Jul. 21, 1987    4,681,304
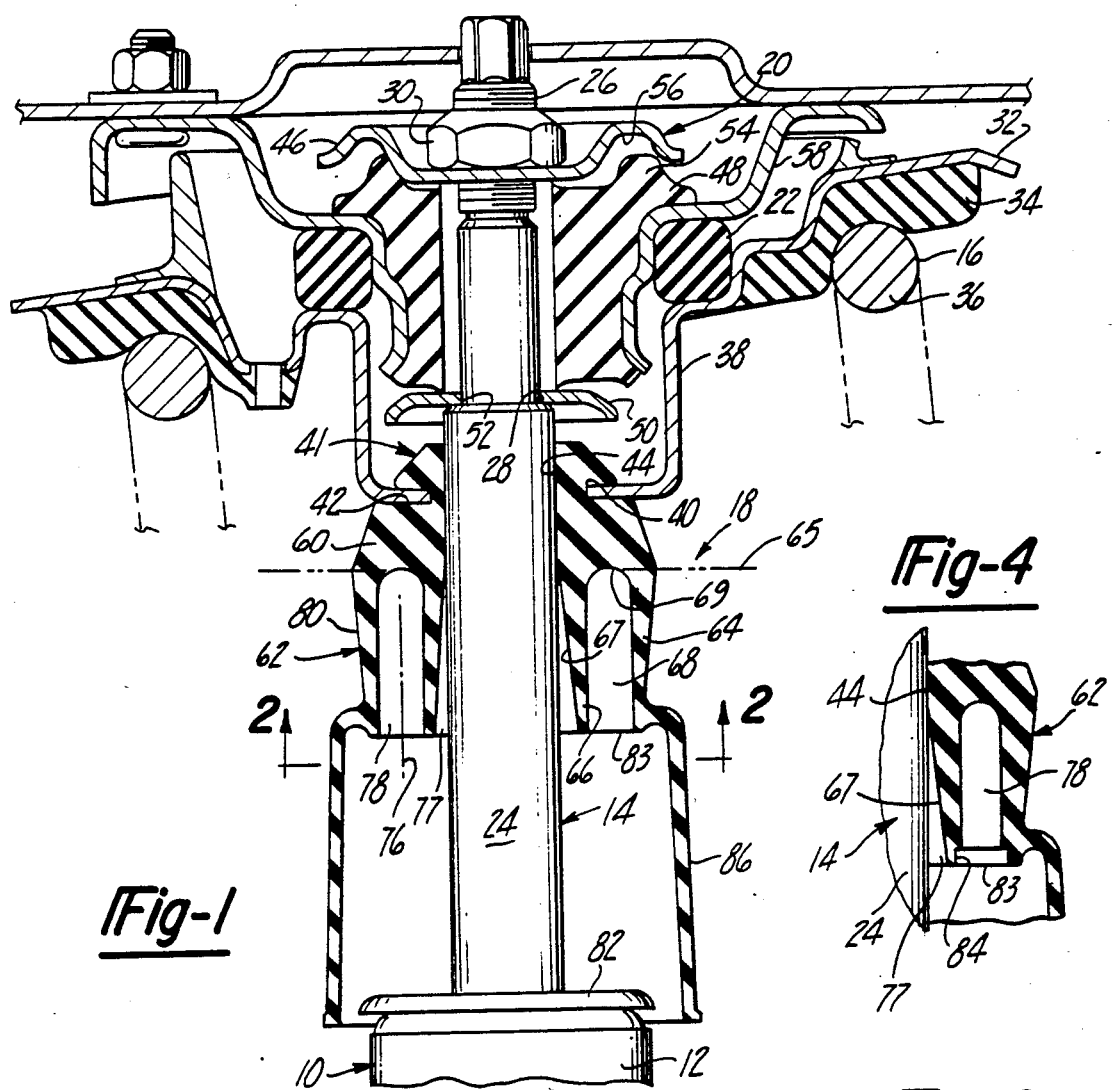
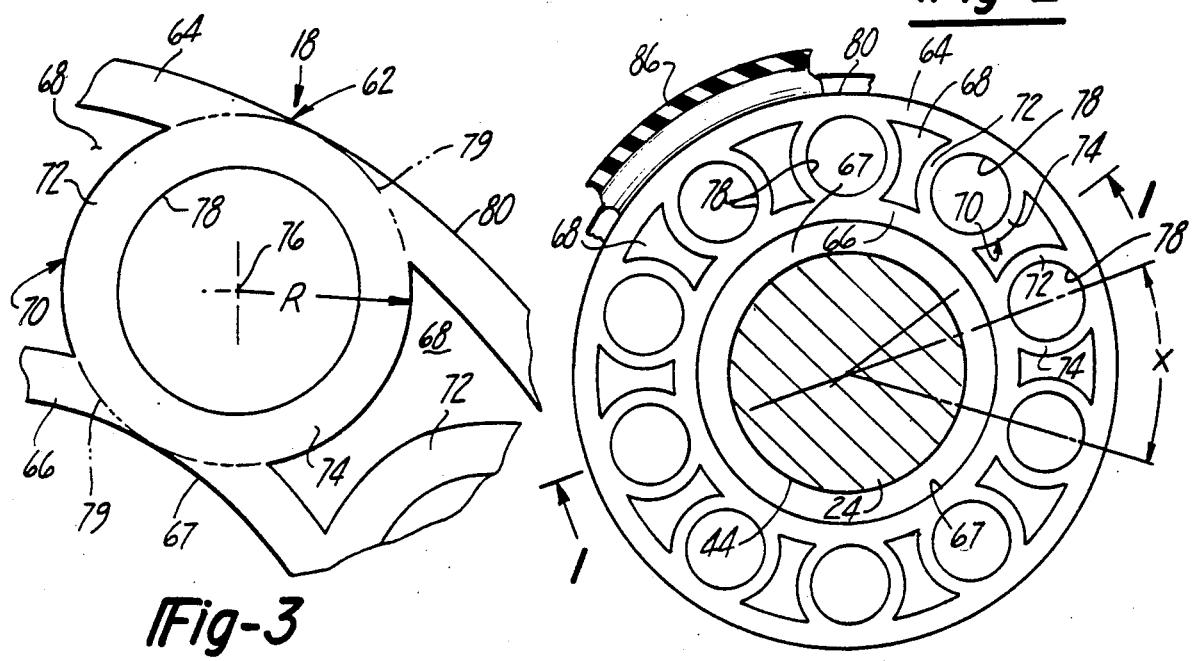

DEFLECTION JOUNCE BUMPER FOR STRUT SUSPENSION

BACKGROUND OF THE INVENTION

This invention relates to automotive suspensions and more particularly to an improved deflection jounce bumper for a suspension strut providing a controlled spring rate to dampen shocks.

Known elastomer or rubber jounce bumpers for controlling MacPherson strut suspension travel at full compression have taken various shapes. As discussed in U.S. Pat. No. 4,256,292 issued Mar. 17, 1981 to Sullivan et al, jounce bumpers are of two main types. The first type is a generally convoluted tube-like member in shape formed of elastomer or rubber material. Convoluted bumpers function by a progressive stacking of the convolutions to provide resistance to jounce forces. Examples of convoluted or ribbed jounce bumpers are found in U.S. Pat. Nos. 4,235,426 and 4,175,770. The main disadvantage of convoluted bumpers is their low initial spring rate requiring large compressive heights.

The second type of jounce bumper is generally a washer-like annular member in shape employing essentially a solid mass of elastomers in straight compression. The U.S. Pat. Nos. 3,954,257 and 4,497,523 are examples of the second type of jounce bumpers which require less compressive height but present excessively high initial spring rates.

SUMMARY OF THE INVENTION

According to the invention, a jounce bumper is provided which has the advantages of both the above-mentioned types of bumpers while obviating their disadvantages. That is, the present bumper provides less travel to dampen shocks by obviating the stack-up compressive height required by a convoluted bumper. Further, by designing a bumper that may be molded from a uniform natural or synthetic rubber material applicant's invention achieves a low cost bumper having high initial dampening together with low displacement.

In the preferred embodiment of the invention, a generally cylindrical shaped solid mass hub encircles the upper end portion of a shock absorber piston rod. The hub lower end portion has concentric cylindrical outer and inner integral wall sections defining an intermediate downwardly opening channel having a defined radial extent and axial depth. The inner and outer wall sections are interconnected by a plurality of axially extending and circumferentially spaced column-like bridging portions formed integral with the inner and outer wall sections. Each of the bridging portions comprise a pair of mirror image arcuate rib-like segments symmetrically disposed about a vertically extending axis. Each pair of arcuate segments define an axial blind bore having a predetermined diameter substantially equal to the radial extent of the channel. Further, each bridging portion with its contiguous inner and outer integral portions of the wall sections, define a hollow cylindrical column-like member. Thus, upon the bumper lower end initially impacting the upper end of its associated shock absorber cylindrical tube, the plurality of column like bridging portions provide a high initial spring rate that achieves initial high dampening without producing ride harshness. As the bumper undergoes progressive compaction, each pair of column arcuate segments, being of uniform thickness, radially stretch so as to form yieldable flexible columns. By virtue of the arcuate segments having a uniform thickness, they stretch to absorb impact energy without developing localized over stressed areas that lead to a reduced life cycle.

BRIEF DESCRIPTION OF THE DRAWINGS

These and other objects and features of the invention will be apparent to those skilled in the vehicle suspension arts upon reading the following detailed description with reference to the accompanying drawings in which:

FIG. 1 is a front view, partly in section, of the upper portion of a vehicle suspension strut embodying the jounce bumper of the present invention;

FIG. 2 is an enlarged horizontal sectional view taken on line 2—2 of FIG. 1;

FIG. 3 is an enlarged fragmentary view of a portion of FIG. 2; and

FIG. 4 is a fragmentary view of a modification of the jounce bumper of FIG. 1.

DESCRIPTION OF THE PREFERRED EMBODIMENT

Referring now to the drawing, a suspension strut 10 of the type generally employed in a MacPherson independent wheel suspension system is partially illustrated in FIG. 1. The suspension strut comprises a tubular housing assembly 12, a cylindrical piston rod member 14 received in the housing 12, a helical suspension spring assembly 16, a jounce bumper 18, a rebound bumper assembly 20 and a resilient isolator ring 22.

The tubular housing assembly 12 and the piston rod 14 cooperate in a known manner to function as a hydraulic spring action modifier in a vehicle suspension system. Adjacent the lower end of the housing assembly 12 is a mounting plate (not shown) whereby the strut 10 may be secured to the wheel assembly of the vehicle (not shown). Reference may be had to the above-mentioned U.S. Pat. No. 4,256,292 for details of the strut mounting plate and vehicle road wheel.

FIG. 1 shows the piston rod as including a lower smooth portion 24 telescopingly received in the housing assembly 12 and an upper threaded portion 26. An upward facing shoulder 28 is formed between the lower and upper rod portions 2, 4 and 26. A nut 30 is threadedly received on the upper threaded rod portion 26 for making portions of the helical spring 16, the jounce bumper 18, the rebound bumper assembly 20, and the resilient isolate ring 22 axially fast against the shoulder 30.

The helical spring assembly 16 includes an upper canted spring seat member 32, having an elastomeric backing 34 bonded to the underside thereof, a lower spring seat member (not shown), and a helical spring 36. U.S. Pat. No. 4,248,454 assigned to the assignee of the present invention, discloses a typical lower spring seat member. The U.S. Pat. No. 4,248,454 patent is incorporated by reference in the instant specification.

The upper seat member 32 includes a downwardly extending cup-shaped portion 38 having an aperture 40 formed therein. The aperture 40 receives a frusto-conical upper end portion 41 defining an annular slot 42 formed in the jounce bumper 18. The bumper 18 is removably locked in the aperture 40 by means of the annular slot 42. This structure permits telescopic snub assembly of central upper bore portion 44 of the bumper over the threaded rod portion 26 to the position shown in FIG. 1. The lower seat member (not shown) is fixedly secured as by welding, to the housing 12 as shown in the above mentioned U.S. Pat. No. 4,248,459 patent. The helical spring 36 is carried between the seat members in a manner effecting an offset with respect to the axis of the rod member 14 and the housing 12 as is well known in the vehicle suspension art.

The rebound bumper assembly 20 includes an upper rebound retainer 46, a rebound bumper sleeve 48 and a lower rebound retainer 50. The lower rebound retainer 50 has an aperture 52 sized to permit assembly over the threaded rod portion 26 to the position abutting the shoulder 28. A rebound bumper ring 54 is formed on the upper end of sleeve 48 and presents an annular surface for reception in inverted channel 56 formed in upper ring 46. The resilient isolator ring 22 is positioned between rebound bumper mounting plate 58 and the upper seat member 32.

The jounce bumper upper end comprises a generally cylindrical shaped solid annular hub portion 60 encircling the piston rod lower smooth portion 24. The jounce bumper lower end portion 62 is formed by a cylindrical outer wall section 64 and a cylindrical inner wall section 66 of lesser diameter. The inner wall section 66 has its inner surface 67 diverging outwardly from the upper bore portion 44 from a horizontally disposed plane defined by dashed construction line indicated at 65 in FIG. 1. The purpose of the frusto-conical surface 67 will be explained below.

As seen in FIG. 2 the outer and inner wall sections 64 and 66 respectively, define an intermediate cylindrical inverted or downwardly opening interrupted channel 68 of predetermined radial extent and axial depth. It will be noted that the closed end 69 of the inverted channel 68 substantially coincides with the horizontal plane defined by construction line 65.

FIG. 2 shows the channel 68 interconnected by a plurality of axially extending and circumferentially spaced column-like bridging portions 70 of substantially uniform cross section throughout their length and formed integral with the inner and outer wall sections. Each channel bridging portion 70 comprises a pair of mirror image arcuate rib-like segments 72 and 74 of predetermined uniform thickness. The arcuate segments 72 and 74 are symmetrically disposed about a vertically extending principal axis 76 of each column like bridging portion 70. The axis 76 is spaced equidistant from the inner 66 and outer 64 wall sections. Each pair of arcuate segments 72 and 74, together with interconnecting portions of the inner and outer wall sections define column blind bore 78 centered about axis 76.

Each pair of arcuate segments 72, 74 together with contiguous portions of the outer 64 and inner 66 wall sections, define column-like bridging portions formed with an outer radius "R" as shown in FIG. 3. In the preferred embodiment there are ten column-like bridging portions 70 arranged with their axis 76 spaced on 36° arcuate center lines indicated by angle "X" in FIG. 2. It will be noted in FIG. 3 that the column-like portions outer radius R is of a predetermined dimension defining an imaginary circle, indicated by dash lines 79. The dashed construction lines 79 are tangent to both outer lower edge of outer wall section 64 surface 80 and the inner lower edge of inner wall surface 67.

During severe jounce loads the shock absorber cap, shown at 82 in FIG. 1, initially impacts the lower end face 83 of the jounce bumper. This impact is absorbed by the ten column-like bridging portions 70 banded together with the outer 64 and inner 66 wall sections to provide a high initial spring or load/deflection rate and thus high early dampening of the shock load. As a result there is minimal axial travel of the piston rod 14. Thus, a minimal compressed height is achieved by the jounce bumper lower end 62 to smoothly absorb the impact energy of the shock loads.

Upon the jounce bumper 18 being further compressed it provides a substantially uniform spring rate. This is achieved because as each column-like portion 70 is stressed, its bore 78 elongates radially into an oval-like configuration. As a result, each pair of the arcuate segments 72, 74 of constant thickness tend to be radially elongated by uniform tension loads providing a plurality of yieldable flexible column-like bridging portions 70. It will be appreciated that as localized stress areas are obviated in the uniform sectioned stretched segments 72 and 74, the service life of the jounce bumper is greatly enhanced.

The frusto-conical shape of the inner wall surface 67 enables each pair of arcuate segments 72 and 74 freedom to elongate or radially stretch by providing a resultant clearance space 77 between the surface 67 and the adjacent portion 24 of the piston rod. It will be noted that the clearance space 77 is at a maximum at lower end face 83 where the stretching of the segments is greatest, resulting in each of the blind bores 78 being elongated in a radial direction. In the disclosed form the inner wall frusto-conical surface 67 is oriented at an angle of about 15° from the vertical. The center wall surface 80 is inclined inwardly at an angle of about 15° from the vertical to define frusto-conical wall surface 80 complementary with wall surface 67.

With reference to the modified form of the invention in FIG. 4, it will be seen that each blind bore 78 is counter-bored at its open end, indicated at 84. The purpose of the counter bores 84 is to provide an initial soft impact or "soft hit" by the shock absorber cap 82 contacting the bumper lower end face 83. That is, the counter bores 84 provide an initial lower spring rate to soften momentary impacts between the jounce bumper face 83 and the cap 82. Thus, the bumper is readily adjustable to provide the desired ride characteristics by adding or deleting the counterbore 84 during molding of the bumper. Also, of course, the depth of the counterbore 84 may be varied to alter the spring rate.

As seen in FIG. 1, a skirt-like cylindrical dust cover 86 may be integrally moulded to the lower end of the jounce bumper to minimize dust contamination of the shock absorber assembly 12. While the bumper 20 is preferably formed from natural rubber, it will be understood that other elastomeric materials are contemplated for use with the invention.

While a preferred embodiment has been shown and described to illustrate the invention, other embodiments will become apparent to those skilled in the art. Accordingly, the scope of this invention is set forth in the following claims.

I claim:

1. A suspension system for a vehicle including sprung and unsprung masses, said masses being separated by a spring bumper, said masses being located by a rod means so that distortion of the spring bumper occurs principally by axial compression, said bumper comprising an integral generally cylindrical body of elastic material such as rubber having opposed upper and lower end faces, said bumper having a solid upper hub portion closely encircling said rod means and a lower impact portion, said lower impact portion including a cylindrical outer wall section and a cylindrical inner wall section, said wall sections being concentrically disposed about said rod means and defining an intermediate cylindrical downwardly opening channel of predetermined radial extent and axial depth, said wall sections being integrally connected by a plurality of axially extending uniformly spaced paired bridging segments, each said pair of segments in the form of a pair of mirror image arcuate segments symmetrically disposed about a vertically extending column axis, each said pair of segments defining with adjacent interconnecting portion of said inner and outer walls an axial column blind bore with said pair of segments having their center of curvature on their associated column bore axis, such that upon aid bumper being impacted said inner and outer wall sections together with said column-like arcuate bridging segments stretching to absorb impact energy thereby providing initially high dampening load displacement resistance.

2. The bumper as set forth in claim 1, wherein said blind bore having a diameter subtantially equal to the radial extent of said channel.

3. The bumper as set forth in claim 1, wherein said inner wall section having its inner surface diverging outwardly from said hub portion so as to define a frustoconical wall surface.

4. The jounce bumper as set forth in claim 1, wherein said pairs of arcuate segments having their centers of curvature uniformly spaced at about 36° intervals.

* * * * *